Sept. 10, 1935.  M. A. WECKERLY  2,013,935
WEIGHING SCALE
Filed May 6, 1932  3 Sheets-Sheet 1
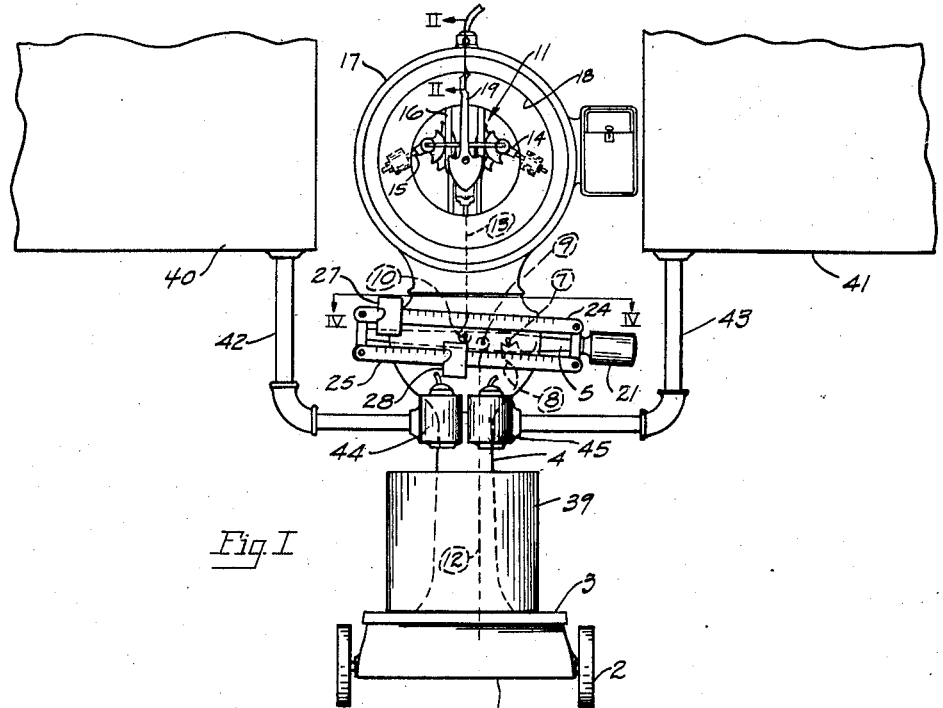
Fig. I
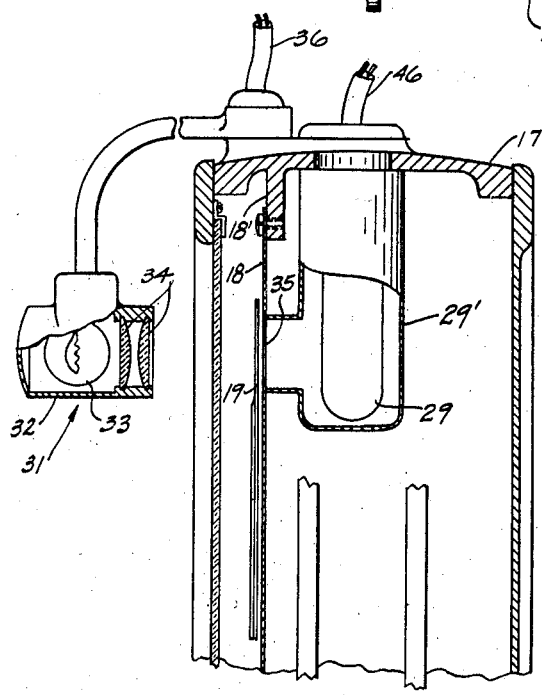
Fig. II
Mark A. Weckerly
INVENTOR
BY C. O. Marshall
ATTORNEY Sept. 10, 1935. M. A. WECKERLY 2,013,935
WEIGHING SCALE
Filed May 6, 1932 3 Sheets-Sheet 2
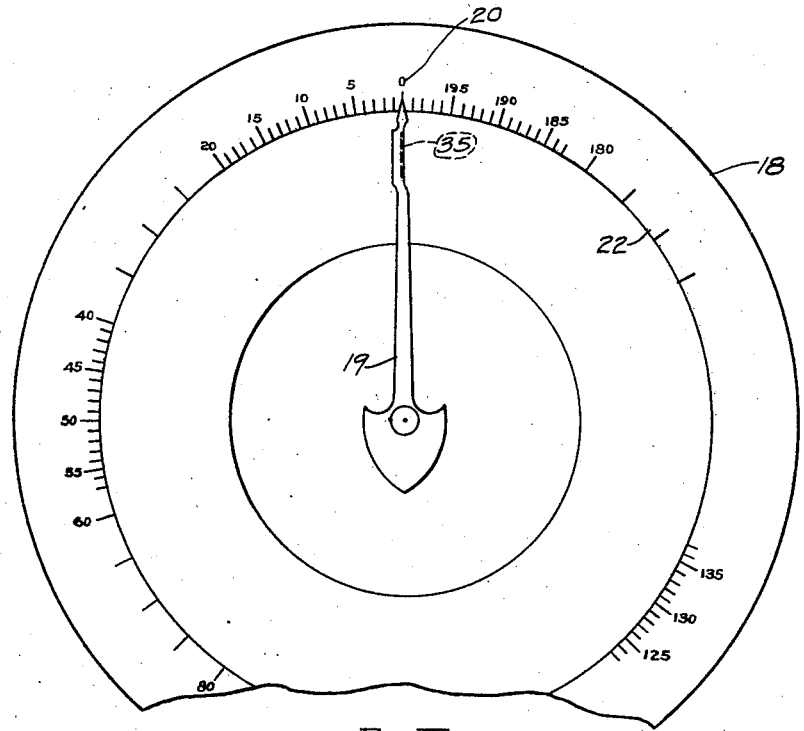
Fig. III
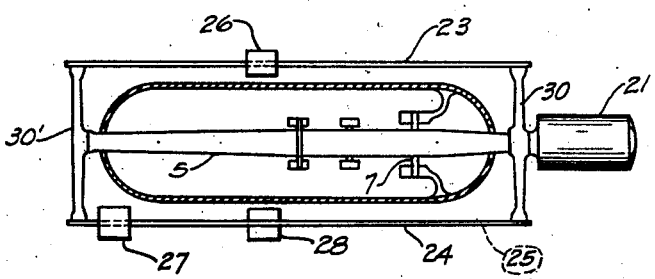
Fig. IV
Mark A. Weckerly
INVENTOR
BY
ATTORNEY Sept. 10, 1935.        M. A. WECKERLY        2,013,935
WEIGHING SCALE
Filed May 6, 1932        3 Sheets-Sheet 3
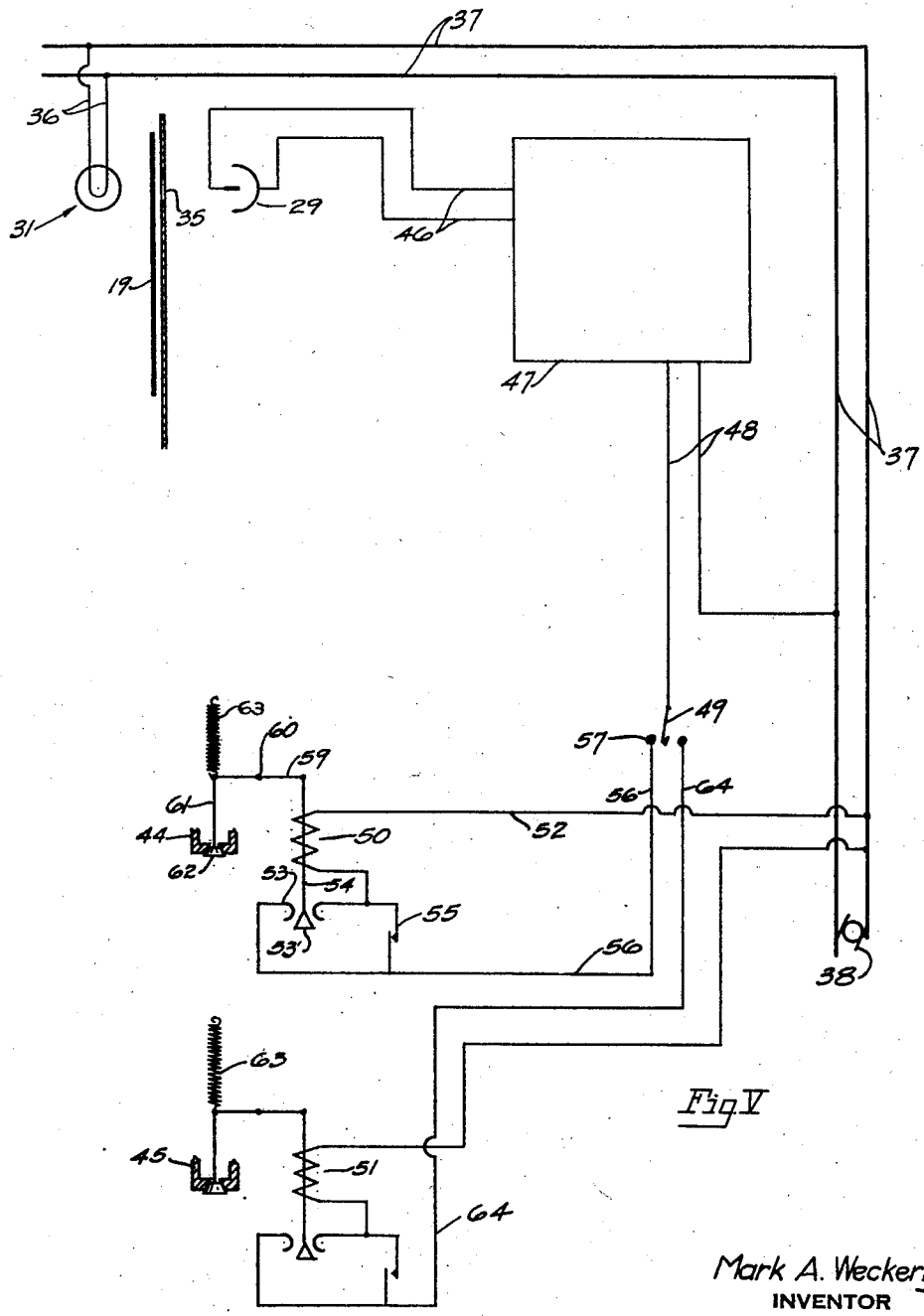
Fig V
Mark A. Weckerly
INVENTOR Patented Sept. 10, 1935

2,013,935

UNITED STATES PATENT OFFICE 2,013,935

WEIGHING SCALE

Mark A. Weckerly, Toledo, Ohio, assignor to Toledo Scale Manufacturing Company, Toledo, Ohio, a corporation of New Jersey Application May 6, 1932, Serial No. 609,628

5 Claims. (Cl. 249—63)

This invention relates generally to weighing scales and in particular to weighing scales which are adapted to control auxiliary mechanisms and more particularly to scales which determine automatically when material flowing, from one of a plurality of containers, into a receptacle on the scale has reached a predetermined amount. A number of constructions have previously been proposed for accomplishing this result. They, however, fell somewhat short of the desired result due to mechanism which, per se, was subject to frictional resistances which, although slight, were greater than the friction permissible in accurate weighing scales.

The principal object of this invention is the provision of improved means for selectively cutting off the flow of material from tanks or bins when predetermined amounts, as determined by an automatic scale have been deposited on the load receiver and in which the controlling means are independent of the scale and exert no reactive influence thereon.

Another object of the invention is the provision of improved means for successively weighing predetermined amounts of ingredients of a compound and automatically controlling feeding means with a photo-sensitive element.

Another object is the provision of improved means incorporated in a scale which automatically and directly indicates the predetermined weight of the material to be weighed before the material flow is cut off.

These and other objects and advantages will be apparent from the following description, in which reference is had to the accompanying drawings illustrating a preferred embodiment of my invention and wherein similar reference numerals designate similar parts throughout the several views.

In the drawings:—

Figure I is a front elevational view of an installation comprising a weighing scale, a part of which is broken away, supply tanks and cut-off valves embodying the invention.

Figure II is an enlarged fragmentary sectional view substantially along the line II—II of Figure I showing in detail photo-electric controlling elements.

Figure III is an enlarged front elevational view of an indicia bearing chart and an index hand co-operating therewith.

Figure IV is an enlarged sectional view through a column substantially along the line IV—IV of Figure I; and Figure V is a wiring diagram of the electrical circuits.

Referring to the drawings in detail, the scale shown incorporated in the embodiment of this invention is generally similar to that described in United States Patent No. 1,543,768 to H. O. Hem but with important modifications. Load supporting levers (not shown) are suitably supported within a base 1, which, to facilitate the transportation of the scale to different locations, is mounted on wheels 2. The levers support a platform or load receiver 3 in the usual manner.

Erected on an extension of the base is a hollow column 4 in which a tare beam lever 5 is rockingly mounted with its fulcrum pivot 7 on brackets 8. Load and power pivots 9 and 10 respectively are also fixed therein in spaced relation to the fulcrum pivot; these serve to transmit the force, due to the action of gravity on a load on the platform, to the counterbalancing system 11 with the co-operation of connecting rods 12 and 13.

The counterbalancing system comprises pendulums 14 and 15, flexibly fulcrumed on a track frame 16 secured in an upright position within a substantially watch-case-shaped housing 17 which surmounts the column.

For the purpose hereinafter described, an indicia bearing chart 18 is provided. This is fastened to bosses 18' in the housing 17, immediately in front of the counterbalancing mechanism 11 and co-operates with an index hand 19, actuated by the counterbalancing mechanism.

In scales of the type herein described, it is customary to counterbalance the weight of the free ends of the load supporting levers and the weight of the platform resting thereon, so that the "initial pull", as the resulting force of these weights is called, is only sufficient to "float" the counterbalancing mechanism and bring the index hand 19 into registration with a zero indicium 20 on the chart 18. This is accomplished by placing lead in a loading box 21 secured to the opposite end of the tare beam lever 5 so that its weight acts in opposition to the weight of the lever and platform. In this embodiment of the invention, however, a considerable portion of the weight of these parts is not so counterbalanced as sufficient "initial pull" is required to overbalance the counterbalancing mechanism an amount equal to the pull of a load amounting to the full chart capacity. This causes the indicator 19 to point to the indicium representing the maximum chart capacity, which, in this case as the indicia circle 22 is continuous, is identical with the zero graduation 20.

To predetermine the weights of loads according to this invention, a plurality of graduated beams 23, 24 and 25 and poises 26, 27 and 28 are provided. These beams are fastened to arms 30 and 30' secured to the ends of the tare beam lever 5 and project beyond the column 4. The weight of beam 23 and its poise 26 which are stationed on the back of the scale, and intended to counterbalance the tare weight of a container for the material being weighed, also counterbalances a considerable portion of the weight of the beams 24 and 25 and poises 27 and 28, thus insuring proper contact of the fulcrum pivot 7 in its bearing.

The photoelectric controlling means which are entirely independent of the weighing mechanism (Figure II) comprise a photoelectric element 29, an enclosure 29', and a light source 31 which includes a tubular housing 32, an electric lamp 33 stationed therein and lenses 34 which serve to concentrate the light from the lamp on a narrow aperture 35 in the chart 18 positioned in a plane passing through the center of rotation of the indicator 19, the zero indicium 20 and the photoelectric element 29 which is stationed in back of the aperture. The photoelectric element being shielded from all light rays by the enclosure 29' must, therefore, receive all the light, for its actuation, through the aperture 35.

Leads 36, connected to a main line 37 of electric current, fed by a source 38, energize the light source 31. When the scale is not in operation or when the desired amount has been deposited on the scale, the indicator 19 is at rest in front of the aperture 35 and effectively prevents luminous radiations to strike the light sensitive element 29. The material to be weighed into the container 39 is stored in tanks 40 and 41. Pipe lines 42 and 43 leading from these tanks are each equipped with a solenoid controlled valve 44 and 45 respectively. These valves are placed, with reference to the scale that the contents of the tanks may flow into a container 39 when standing on the scale platform.

The photoelectric element for controlling the solenoid valves is connected by means of leads 46 to a thermionic amplifying and relay system 47; this system is well known and widely understood and as it, per se, forms no part of my invention, I have not shown it in detail nor will I describe it at length. A lead 48 connected through a relay in the system 47 to the main line 37 is provided with a switch 49 which is adapted to selectively bring the photoelectric element 29 into controlling relation to valve solenoids 50 and 51 and their respective circuits. The circuit co-operating with valve 44 comprises the previously referred to solenoid coil 50, a hold-in switch 53 co-operating with the armature 54 of the coil 50, a push button switch 55 and leads 52 and 56. The lead 52 connects one terminal of the coil 50 to the main line 37 of electric current and the lead 56, connected with one of its ends to a terminal of the "hold-in" switch 53, is provided with a contact member 57 adapted to be selectively engaged by the switch 49.

The circuit co-operating with the valve 45, being in all particulars identical with the circuit above referred to, needs no further description.

The operation of the device may be understood from the following description. Let us assume that it is desired to fill a series of containers with predetermined amounts of two liquids, assuming that in this example 20 pounds of one constituent is required and 80 pounds of the second. The first step in the operation is to determine the weight of empty container 39 and tare this weight by shifting the position of the poise 26 on the beam 23 in the usual manner. The poise 28 is now moved on the beam 25 until its index registers with the 20 pound graduation. This offsets some of the "initial pull" of the scale and the counterbalancing pendulums 14 and 15 having less "pull" to balance, move downwardly on the frame 16 until their weight moment again equals the "pull". The indicator 19 which is actuated by the counterbalancing mechanism, moves in an anti-clockwise direction through an angular distance which is proportional to the "pull" and in this example will stop when its point comes into registry with the 20 pounds indicium.

To open the valve 44 to initiate the flow of the material in the respective tank through its pipe line, the operator of the device presses the switch 55; this closes the circuit energizing the solenoid coil 50. The flux set up therein raises the armature 54 and the contact member 53' closes the open hold-in switch 53 insuring a flow of energizing current in the coil 50 after the pressure is removed from the push button switch 55. The upper end of the armature 54 pivotally engages one end of a lever 59 pivoted at 60 (in the interior of the valve body). The opposite end of this lever is pivotally engaged by a stem 61 having a valve piston 62 secured at its lower end, which effectively closes the outlet of the valve. When, therefore, the coil 50 is energized, upward movement of the armature, through the lever 59 moves the piston 62 away from the outlet and the material from one of the tanks flows into the container 39. The weight of this, accumulating on the load supporting lever system of the scale gradually balances the offsetting effect of the poise, and the pendulums 14 and 15 again move upwardly on the frame 16, due to the steadily increasing "pull" until the indicator 19 covers the aperture 35 in the chart 18.

Immediately, when the aperture is shielded by the indicator, the resistance of the photoelectric element increases so that the current, which had closed a relay in the system 47 when the aperture was uncovered by shifting the poise 28, is reduced to a value insufficient to keep the relay closed; this opens and breaks the circuit energizing the solenoid coil 50, and a spring 63 which is provided for this purpose, pulls the piston 62 into engaging relation with the outlet and effectively cuts off the flow of material from the tank.

To obtain the desired amount of the material in the tank 41, the switch 49 is now moved to engage a lead 64, the function of which, in this circuit, is identical with that of lead 56 in the circuit of the valve 44. The cycle of operations from this point is identical with the one hereinbefore described, and the flow of material is cut off when the desired amount has been deposited in the container.

It will be readily seen that, by the addition of beams and poises, predetermined amounts of other materials may be weighed in the same manner; it will further be seen that the invention may be employed to control the delivery of material other than liquids by the provision of suitable bins and discharge and cut-off means. It will also be seen that the invention herein disclosed is well adapted to adequately fulfill the objects primarily stated and that it is susceptible to variation, modification and change within the spirit and scope of the subjoined claims.

Having described my invention, I claim:

1. In a device of the class described, in combination, weighing mechanism and electrical mechanism adapted to be controlled thereby, said weighing mechanism comprising load supporting means, automatic load counterbalancing mechanism, and manipulative load offsetting means, co-acting indicating means and means adapted to control said electrical mechanism, said automatic load counterbalancing mechanism being normally in maximum counterbalancing condition, said manipulative load counterbalancing means being adapted to reduce such counterbalancing effect of said automatic load counterbalancing mechanism an amount equal to the predetermined weight of a load, and means, associated with said counterbalancing means and said indicating means controlled thereby for controlling said electrical mechanism.

2. In a device of the class described, in combination, weighing mechanism and electrical mechanism adapted to be controlled thereby, said weighing mechanism comprising load supporting means, automatic load counterbalancing mechanism, and manipulative load offsetting means, indicating means co-acting therewith, said automatic load counterbalancing mechanism being normally in maximum counterbalancing condition, said manipulative load counterbalancing means being adapted to reduce such counterbalancing effect of said automatic load counterbalancing mechanism an amount equal to the predetermined weight of a load, and means, associated with said counterbalancing means and said indicating means controlled thereby, for controlling said electrical mechanism when a load equal to the reduction of the counterbalancing effect of said automatic load counterbalancing mechanism is placed on said load receiver.

3. In a device of the class described, load delivering means, weighing mechanism in co-operative relation thereto, said weighing mechanism comprising automatic load counterbalancing mechanism and associated manipulative load offsetting means, said automatic load offsetting means comprising pendulums normally in maximum counterbalancing condition, said associated means being adapted to reduce such counterbalancing effect of said pendulums a predetermined amount and photo-sensitive means controlled by said weighing mechanism, adapted to control said load delivering means when a load equal in weight to the reduction of the counterbalancing effect of said pendulums is placed on said weighing mechanism.

4. In a device of the class described, in combination, weighing mechanism, means for delivering loads in co-operative relation therewith, said weighing mechanism comprising automatic load counterbalancing pendulums, and a plurality of load offsetting beams and poises, said automatic load counterbalancing pendulums being normally in maximum counterbalancing condition, said load offsetting beams and poises being adapted to successively reduce the counterbalancing effect of said pendulum predetermined amounts and photo-sensitive means controlled by said load offsetting pendulums for controlling selectively and successively said means for delivering loads when predetermined amounts of such loads are delivered.

5. In a device of the class described, in combination, weighing mechanism including a load receiver and load feeding means, said weighing mechanism comprising pendulum load counterbalancing mechanism, indicating means actuated thereby, manipulative load offsetting means co-operating with said pendulum mechanism and said indicating means, said manipulative load offsetting means being adapted to determine the amount of each load to be deposited on the load receiver of said weighing mechanism by said load feeding means, said indicating means being adapted to indicate the weight of the undeposited increment of the predetermined load and photosensitive means in co-operative relation to said indicating means to control said load feeding means to cut off the flow of material when the indicating means indicate that the predetermined amount thereof has been deposited.

MARK A. WECKERLY.